Patented Nov. 15, 1949

2,487,864

UNITED STATES PATENT OFFICE 2,487,864

LINEAR POLYVINYL ACETALS

Cecil W. Gayler, Ridley Park, Pa., assignor to American Viscose Corporation, Wilmington, Del., a corporation of Delaware No Drawing. Application September 8, 1948, Serial No. 48,321

16 Claims. (Cl. 28—82)

This invention relates to linear polyvinyl acetals, a method of making them, and the manufacture of shaped articles therefrom. This application is a continuation-in-part of my prior application Serial No. 510,488, filed November 16, 1943, now abandoned.

Heretofore it has been the general practice to produce polyvinyl acetals by condensation of a polyvinyl alcohol with an aldehyde or aldehyde-developing polymer in solution in a polar solvent such as an aqueous medium containing a mineral acid catalyst for the reaction, under which conditions the aldehyde has to react with the alcohol in the dissolved state. In order to bring about condensation of the aldehyde with a polyvinyl alcohol in the dissolved state, in any practical length of time, external heat has to be applied for a time the duration of which depends on the temperature employed. At 40 to 60° C. it may require as long as two days for the reaction. At higher temperatures, the reaction time may be shorter, about ten hours. In the absence of external heat, several weeks are required, unless excess aldehyde is used to drive the reaction to completion. When external heat and/or excess aldehyde is used the resulting product has as high as 95% of the hydroxyl groups converted to acetal linkages and, since the use of external heating, or of excess aldehyde, or both, induces the reaction of one molecule of the aldehyde with two hydroxyl groups each of which is on a different chain, the chains are merged into three dimensional groups and the product contains cross-links in an amount such that the product cannot be readily extended.

Useful textile filaments cannot be obtained from polyvinyl acetals containing any appreciable number of cross-links. A cross-linked structure cannot be stretched and therefore orientation of the molecules in the direction of the fiber axis, essential to high tenacity and extensibility in the filaments, and resulting from stretching, cannot be effected. Fibers formed from the typical polyvinyl acetals of the prior art have so little tensile strength that they can be crumbled between the fingers. The acetals previously available have had the additional disadvantage that they are soluble in a large number of common organic solvents.

One object of the present invention is to provide a polyvinyl acetal which is entirely free of cross-links between chains. Another object is to provide a fiber-forming polyvinyl acetal capable of accepting stretch whereby the molecules are oriented in the direction of the fiber axis. Another object is to provide a method of making linear polyvinyl acetals in a period of time not greater than one-half hour, in the absence of external heat and/or pressure. A further object is to produce directly a solution of a linear polyvinyl acetal suitable for spinning into synthetic fibers, casting to films, etc. An additional object is to produce useful synthetic textile fibers and filaments consisting of a linear polyvinyl acetal and characterized by high tenacity and extensibility.

In accordance with the invention, linear polyvinyl acetals are obtained in from 20 to 30 minutes in the absence of external heat and pressure, by condensing an aldehyde, i. e. formaldehyde or acetaldehyde or their aldehyde-developing polymers, trioxymethylene or paraldehyde, with a polyvinyl alcohol in suspension in a medium which is a solvent for the acetal formed, but not a solvent for the polyvinyl alcohol, and in which the water split out during the condensation is soluble.

In practicing the invention, the polyvinyl alcohol and aldehyde are suspended in 1,4-dioxane and hydrogen chloride gas is bubbled continuously through the suspension until the condensation reaction is completed. For the aldehydes mentioned, the conditions are critical and experiment with a large number of other non-polar media lead to the conclusion that the use of a mixture of 1,4-dioxane and hydrogen chloride gas is necessary for accomplishing the objects of this invention.

The reaction of the aldehyde and alcohol in 1,4-dioxane hydrogen chloride gas mixture is exothermic and goes to completion rapidly, without the use of external heat. During the course of the reaction, the temperature rises and may reach 60° C. or so. If desired, outside cooling may be employed to offset the tendency of the temperature to increase, but such cooling is optional and not required because exposure of the mass to the elevated temperature for the extremely short period required for the reaction does not effect cross-linking of the chains.

As soon as hydrogen chloride gas is passed into the mixture of polyvinyl alcohol, dioxane, and aldehyde, the temperature rises and a gel is formed. After about five minutes the gel changes to a viscous solution. The resinous solution thus obtained can be spun directly into water to form synthetic fibers, or cast to form films.

During the condensation reaction, some water is split out. The water is soluble in 1,4-dioxane and is absorbed thereby. If a sufficiently large amount of dioxane is present, the water split off will be entirely absorbed thereby and will remain as a constituent of the final solution, in a blend with the 1,4-dioxane. If all of the water is not absorbed by the 1,4-dioxane, as happens when smaller amounts of 1,4-dioxane are used (for example 70 to 85% depending on molecular weight and percent ester groups on the polyvinyl alcohol) the water not absorbed will be saturated by the hydrogen chloride gas, forming hydrochloric acid, which will separate out in the form of a layer, due to the "salting out" effect of the hydrogen chloride gas, which "salts out" the dioxane. In any event, the medium is initially anhydrous and the relatively small amount of water split out during the reaction is insufficient to dissolve any appreciable quantity of the alcohol. This is in contrast to the effects obtained when hydrochloric acid as such is added to the reaction and the reaction is carried out in the presence of both the water of the acid and the water formed in the reaction. Polyvinyl alcohol is not soluble in the 1,4-dioxane hydrogen chloride gas mixture in which the condensation is performed, but that mixture is a solvent for the polyvinyl acetal which, under the preferred conditions, is dissolved therein as it is produced, providing a driving force for the reaction.

The final product consists of a resinous solution of a linear polyvinyl acetal of which from 80 to 90% of the hydroxyl groups originally present in the polyvinyl alcohol have been converted to acetal linkages, in a mixture consisting of dioxane and dissolved hydrogen chloride, and which may also contain water in a blend with the dioxane. The acetal has a molecular weight in the neighborhood of 10,000 to 30,000 or higher. The number of hydroxyl groups converted to formal linkages is critical for the production of synthetic fibers and films, and is in the range of from 80 to 90% for a polyvinyl alcohol containing, initially, from 0 up to about 10% ester groups. If too many ester groups, for example, acetate groups, are present in the final acetal, the product has a low softening point and is soluble in a large number of organic solvents. If too many hydroxyl groups are converted to acetal linkages, (some of which are inevitably cross-links) the product is brittle and inextensible; it cannot be oriented by stretching. If the product contains too many hydroxyl groups, it is water-susceptible and fibers made from it are characterized by high shrinkage in water at laundering temperatures. The present invention makes possible the production of a linear acetal containing a controlled proportion of acetate groups, free hydroxyl groups, and acetal linkages.

Polyvinyl alcohols are generally produced by complete or partial hydrolysis of a polyvinyl ester. The present process may be used for the production of acetals from polyvinyl alcohols resulting from complete or partial hydrolysis of an ester, depending on the purpose for which the acetal is intended. When the resinous solution of the acetal is to be spun into synthetic filaments, the starting polyvinyl alcohol is preferably one which is free of, or substantially free of, ester groups. For other purposes, for instance when the acetal is to be used as a finishing or coating agent for textiles or the like, or in the fabrication of massive molded articles, cinematographic film, laminated sheets, etc., the starting alcohol may contain up to 10% ester groups, for example, acetate groups.

When the polyvinyl acetal produced according to my improved process is obtained from a polyvinyl alcohol which is substantially free from ester groups, highly desirable artificial filaments or films may be obtained by spinning or casting the solution directly into suitable coagulating media.

This may be accomplished by spinning the solution of the linear polyvinyl acetal according to either the wet or dry spinning processes. In the former case, the solution may be cast or spun through an appropriate spinneret or jet directly into a suitable coagulating bath at room temperature. Such a bath may consist of any medium in which the solvent for the resin is soluble, and in which the resin is insoluble. Thus, for example, the resinous solution may be spun into water through a 300 or 500-hole spinneret having holes of from 2.5 to 3 mils in size, at about 25° C., using a regular viscose gear spinning pump to propel the viscous solution. The coagulating bath may consist of water either alone or containing adjuvants, such as plasticizing agents, delustrants, dyes, pigments, etc.

The dry spinning process is also applicable, in which case the resinous solution containing the linear polyvinyl acetal is spun or cast into an evaporative atmosphere, such as warm air, or other inert gas, in order to cause evaporation of the solvent.

My tests have shown that, whereas fibers obtained by spinning the typical polyvinyl acetals of the prior art are coarse and brittle, and substantially inextensible, samples thereof even breaking apart readily upon subjection to a light pull between the fingers, the fibers obtained by spinning the linear polyvinyl acetals prepared according to my invention as described herein, are thermoplastic, smooth, and tough. They can be given a stretch of 100% or more between godets at 25° C., and may be subjected to a further after-stretch of at least another 100% in a steam cell, at 90 to 100° C. The stretched fibers show by characteristic X-ray diffraction patterns of orientation of the molecules along the fiber axis, and the tensile strength of the fibers is increased considerably thereby. Such filaments have been found to have a dry tenacity of up to at least 4 grams per denier, and a wet tenacity of up to at least 3.3 grams per denier; dry elongation of from about 10 to 18%, and wet elongation of about 10 to 20%.

The linear polyvinyl acetals of my invention are insoluble in practically all common organic solvents. The following table illustrates the results obtained when a linear polyvinyl formal obtained according to my invention was tested for solubility in various solvents.

Solvent:
    Acetic acid _____ [1] P. S.
    Acetone _____ I
    Acetonitrile _____ I
    Benzene _____ I
    Chloroform _____ I
    Dichloracetic acid _____ S
    Dioxane _____ I
    Dioxanic HCl _____ S
    Ethanol _____ I
    Ether _____ I
    Ethyl Cellosolve _____ SW
    Ethylene chlorohydrin _____ P. S.
    Formamide _____ I
    Hydrochloric acid (dil) _____ S
    Methanol _____ I
    Toluene _____ I

[1] I—insoluble; S—soluble; SW—swells; P. S.—partly soluble.

The following specific examples are given for the purpose of illustrating my invention.

Example I

Equivalent amounts of powdered polyvinyl alcohol (containing 1.5% acetate groups) and trioxymethylene were suspended, by stirring, in anhydrous 1,4-dioxane, forming a suspension of about 20% total solids. Hydrogen chloride gas was bubbled through the suspension whereupon the suspended material went into solution, forming a clear gel at first, which, upon continued stirring and passage of hydrogen chloride, became a viscous solution. There was considerable evolution of heat, raising the temperature to about 60° C. The reaction was complete in about 20–30 minutes. About 80–90% of the hydroxyl groups of the polyvinyl alcohol were converted to formal linkages, and the formal had a molecular weight of about 17,000. In this instance, where the dioxane was used in an amount of 80%, the resulting product contained a small amount of water from the reaction which separated and was withdrawn as hydrochloric acid after the reaction was completed. The final product consisted of a resinous solution of the acetal in 1,4-dioxane containing dissolved hydrogen chloride.

Example II

Twenty-two parts of powdered polyvinyl alcohol (obtained by complete hydrolysis of polyvinyl acetate) and 15 parts of formaldehyde were suspended, by stirring, in 300 parts of 1,4-dioxane. Hydrogen chloride gas was bubbled through the suspension, whereupon the suspended material went into solution, forming a clear gel at first. Upon continued stirring, and passing of hydrogen chloride gas the gel was dissolved, forming a clear viscous solution. The reaction was complete in 20–30 minutes, during which time the temperature rose to about 60° C. All of the water formed in the reaction was absorbed by the 1,4-dioxane and there was no separation of water. The product was homogeneous and consisted of a clear liquid amber solution of the acetal in a mixture consisting of the 1,4-dioxane, dissolved hydrogen chloride, and water blended with the 1,4-dioxane. About 90% of the hydroxyl groups of the polyvinyl alcohol were converted to formal linkages, and the formal had a molecular weight of 27,000.

Example III

The resinous solution of the polyvinyl acetal obtained according to the process described in Example I was spun through a multiple-hole spinneret into an aqueous coagulating bath at 25° C. The coagulated filaments were withdrawn from the bath and given a stretch of 100% between godets at 25° C., after which they were stretched an additional 100% in a steam cell at 90° C.

In contrast to the results obtained when polyvinyl alcohol is condensed with one of the aldehydes mentioned herein, in an initially anhydrous medium consisting of 1,4-dioxane and hydrogen chloride gas, when the condensation is effected in other non-polar solvents, such as toluene, benzene, or heptane, through which hydrogen chloride gas is bubbled continuously, the resulting product is a black gel which is not soluble in the reaction medium, which cannot be purified, and which is useless for the present purposes.

It was attempted to perform the reaction in a large number of other solvents, hydrogen chloride gas being bubbled through the solvent in each case, and the conditions being similar to those of Example II. In every instance, a reaction took place, but the products formed were useless. The results obtained with the various solvents tried are listed in the following table:

Ethyl methylketone—formed a suspension of swelled particles which darkened on standing.
Tetrahydrofuran—black gel.
Ethanol+acetone—black gel.
Cellosolve acetate—formed white translucent gel which turned black on standing for a few days.
Dimethoxytetraethylene glycol—black gel.
Diethyl Cellosolve—black liquid—two layers, one layer of water and one of suspended gel particles.
Acetal—Very dark, two layers—resin layer not suitable for spinning; comprises a suspension of jelled particles.

Any variation or modification of the invention as described above which conforms to the spirit of the invention is intended to be included within the scope of the appended claims.

I claim:

1. A linear polyvinyl acetal resulting from the condensation of a polyvinyl alcohol selected from the group consisting of polyvinyl alcohols containing no ester groups and polyvinyl alcohols containing up to 10% of ester groups and an aldehyde selected from the group consisting of formaldehyde, acetaldehyde, trioxymethylene, and paraldehyde, in suspension in an initially anhydrous non-polar medium consisting of 1,4-dioxane in the presence of hydrogen chloride gas distributed through the medium, and in the absence of external heat and pressure.

2. A linear polyvinyl formal resulting from the condensation of a polyvinyl alcohol selected from the group consisting of polyvinyl alcohols containing no ester groups and polyvinyl alcohols containing up to 10% of ester groups and trioxymethylene, in suspension in an initially anhydrous non-polar medium consisting of 1,4-dioxane in the presence of hydrogen chloride gas distributed through the medium, and in the absence of external heat and pressure.

3. A solution adapted to be directly spun into water to form artificial fibers capable of being stretched to effect orientation of the molecules in the direction of the fiber axis and comprising the resinous solution of a linear polyvinyl acetal obtained by suspending a polyvinyl alcohol selected from the group consisting of polyvinyl alcohols containing no ester groups and polyvinyl alcohols containing up to 10% of ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the alcohol and aldehyde is completed, the reaction being carried out in the absence of external heat and pressure.

4. A solution to be directly spun into water to form artificial fibers capable of being stretched to effect orientation of the molecules in the direction of the fiber axis and comprising the resinous solution of a polyvinyl formal obtained by suspending a polyvinyl alcohol selected from the group consisting of polyvinyl alcohols containing no ester groups and polyvinyl alcohols containing up to 10% of ester groups and trioxymethylene in 1,4-dioxane, and continuously bubbling hydrogen chloride gas through the suspension until the reaction between the alcohol and aldehyde is completed, the reaction being carried out in the absence of external heat and pressure.

5. A process for the production of a linear polyvinyl acetal comprising suspending a polyvinyl alcohol selected from the group consisting of polyvinyl alcohols containing no ester groups and polyvinyl alcohols containing up to 10% of ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the polyvinyl alcohol and aldehyde is completed, the reaction being carried out in the absence of external heat and pressure.

6. The process for the production of a linear polyvinyl formal comprising suspending a polyvinyl alcohol selected from the group consisting of polyvinyl alcohols containing no ester groups and polyvinyl alcohols containing up to 10% of ester groups and trioxymethylene in 1,4-dioxane, and continuously bubbling hydrogen chloride gas through the suspension until the reaction between the alcohol and aldehyde is completed, the reaction being carried out in the absence of external heat and pressure.

7. A stretched synthetic fiber showing, by characteristic X-ray diffraction patterns, orientation of the molecules along the fiber axis, and comprising a linear polyvinyl acetal, said acetal being substantially entirely free of cross-links between molecular chains and obtained by suspending a polyvinyl alcohol containing up to 10% of ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the alcohol and aldehyde is completed, the reaction being carried out in the absence of external heat and pressure.

8. A stretched synthetic fiber showing, by characteristic X-ray diffraction patterns, orientation of the molecules along the fiber axis, and comprising a linear polyvinyl formal, said formal being substantially free of cross-links between molecular chains and obtained by suspending a polyvinyl alcohol selected from the group consisting of polyvinyl alcohols containing no ester groups and polyvinyl alcohols containing up to 10% of ester groups and trioxymethylene in 1,4-dioxane, and continuously bubbling hydrogen chloride gas through the suspension until the reaction between the alcohol and aldehyde is completed, the reaction being carried out in the absence of external heat and pressure.

9. A linear polyvinyl acetal resulting from the condensation of a polyvinyl alcohol which does not contain ester groups and an aldehyde selected from the group consisting of formaldehyde, acetaldehyde, trioxymethylene, and paraldehyde, in suspension in an initially anhydrous non-polar medium consisting of 1,4-dioxane, in the presence of hydrogen chloride gas distributed through the medium, and in the absence of external heat and pressure.

10. A linear polyvinyl acetal resulting from the condensation of a polyvinyl alcohol containing up to 10% of ester groups and an aldehyde selected from the group consisting of formaldehyde, acetaldehyde, trioxymethylene, and paraldehyde, in suspension in an initially anhydrous non-polar medium consisting of 1,4-dioxane, in the presence of hydrogen chloride gas distributed through the medium, and in the absence of external heat and pressure.

11. A solution adapted to be directly spun into water to form artificial fibers capable of being stretched to effect orientation of the molecules in the direction of the fiber axis and comprising the resinous solution of a linear polyvinyl acetal obtained by suspending a polyvinyl alcohol which does not contain ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the alcohol and aldehyde is completed, the reaction being carried out in the absence of external heat and pressure.

12. A solution adapted to be directly spun into water to form artificial fibers capable of being stretched to effect orientation of the molecules in the direction of the fiber axis and comprising the resinous solution of a linear polyvinyl acetal obtained by suspending a polyvinyl alcohol containing up to 10% of ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the alcohol and aldehyde is completed, the reaction being carried out in the absence of external heat and pressure.

13. A process for the production of a linear polyvinyl acetal comprising suspending a polyvinyl alcohol which does not contain ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the polyvinyl alcohol and aldehyde is completed, the reaction being carried out in the absence of external heat and pressure.

14. A process for the production of a linear polyvinyl acetal comprising suspending a polyvinyl alcohol containing up to 10% of ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the polyvinyl alcohol and aldehyde is completed, the reaction being carried out in the absence of external heat and pressure.

15. A stretched synthetic fiber showing, by characteristic X-ray diffraction patterns, orientation of the molecules along the fiber axis, and comprising a linear polyvinyl acetal, said acetal being substantially entirely free of cross-links between molecular chains and obtained by suspending a polyvinyl alcohol selected from the group consisting of polyvinyl alcohols which do not contain ester groups and polyvinyl alcohols containing up to 10% of ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the alcohol and aldehyde is completed, the reaction being carried out in the absence of external heat and pressure.

16. A stretched synthetic fiber showing, by characteristic X-ray diffraction patterns, orientation of the molecules along the fiber axis, and comprising a linear polyvinyl acetal, said acetal being substantially entirely free of cross-links between molecular chains and obtained by suspending a polyvinyl alcohol which does not contain ester groups and an aldehyde selected from the group consisting of formaldehyde, acetaldehyde, trioxymethylene, and paraldehyde in 1,4-dioxane, and continuously bubbling hydrogen chloride gas through the suspension until the reaction between the alcohol and aldehyde is completed, the reaction being carried out in the absence of external heat and pressure.

CECIL W. GAYLER.

REFERENCES CITED

The following references are of record in the file of this patent:

UNITED STATES PATENTS

| Number | Name | Date |
|---|---|---|
| Re. 20,080 | Robertson | Aug. 25, 1936 |
| 2,035,939 | Belloc | Mar. 31, 1936 |
| 2,044,730 | Kuehn | June 16, 1936 |
| 2,055,391 | Starck | Sept. 22, 1936 |
| 2,154,057 | Thielking | Apr. 11, 1939 |
| 2,310,943 | Dorough | Feb. 16, 1943 |
| 2,328,125 | Buchsbaum | Aug. 31, 1943 |
| 2,328,219 | Land | Aug. 31, 1943 |
| 2,356,479 | Swan | Aug. 22, 1944 |
| 2,396,209 | Sharkey | Mar. 5, 1946 |

FOREIGN PATENTS

| Number | Country | Date |
|---|---|---|
| 387,976 | Great Britain | Feb. 16, 1933 |
| 419,826 | Great Britain | May 18, 1934 |
| 483,222 | Great Britain | Apr. 8, 1938 |

OTHER REFERENCES

Ser. No. 715,003, Wulff (A. P. C.) pub. Apr. 27, 1943.

Certificate of Correction

Patent No. 2,487,864 November 15, 1949

CECIL W. GAYLER

It is hereby certified that errors appear in the printed specification of the above numbered patent requiring correction as follows:

Column 4, line 24, for "resinpus" read *resinous*; column 5, line 20, for "17,000" read *27,000*;

and that the said Letters Patent should be read with these corrections therein that the same may conform to the record of the case in the Patent Office.

Signed and sealed this 7th day of March, A. D. 1950.

[SEAL]

THOMAS F. MURPHY,
*Assistant Commissioner of Patents.*